United States Patent

Paquin

Patent Number: 5,088,087
Date of Patent: Feb. 11, 1992

[54] DUAL-METAL REFLECTIVE LAYER RECORDABLE/ERASABLE OPTICAL MEDIA

[75] Inventor: Don P. Paquin, San Jose, Calif.

[73] Assignee: Tandy Corporation, Ft. Worth, Tex.

[21] Appl. No.: 558,137

[22] Filed: Jul. 25, 1990

[51] Int. Cl.$^5$ .............. G11B 7/24; G01D 15/34; G11C 13/04

[52] U.S. Cl. .................. 369/283; 369/284; 369/286; 346/135.1; 346/76 L; 430/945; 365/124; 365/126

[58] Field of Search .............. 369/280, 282, 283, 284, 369/286, 288, 275.2, 275.4; 346/135.1; 430/945

[56] References Cited

U.S. PATENT DOCUMENTS

| | | | |
|---|---|---|---|
| 4,398,203 | 8/1983 | Cornet | 346/135.1 |
| 4,527,173 | 7/1985 | Gupta et al. | |
| 4,645,712 | 2/1987 | Ishigaki et al. | |
| 4,651,172 | 3/1987 | Watanabe et al. | 346/135.1 |
| 4,709,363 | 11/1987 | Dirks et al. | 369/275.1 |
| 4,719,615 | 1/1988 | Feyrer et al. | |
| 4,725,502 | 2/1988 | Kiyomiya et al. | 346/135.1 X |
| 4,822,675 | 4/1989 | Funkenbusch et al. | 369/13 X |
| 4,839,883 | 6/1989 | Nagata et al. | 346/135.1 X |
| 4,879,709 | 11/1989 | Clark . | |
| 4,896,314 | 1/1990 | Skiens et al. . | |

*Primary Examiner*—Stuart S. Levy
*Assistant Examiner*—Kenneth B. Wells
*Attorney, Agent, or Firm*—Townsend and Townsend

[57] ABSTRACT

Recordable/erasable optical storage media are disclosed. The medium of the present invention generally comprises a rigid substrate, an expansion layer, a retention layer, and a dual-metal reflective layer. A single, active layer may be substituted for the expansion and retention layers. A protective layer may or may not be present. The dual-metal reflective layer comprises a first metal sublayer and a second metal sublayer with a graded first metal/second metal alloy at the interface of the first metal sublayer and the second metal sublayer. Methods for applying the dual-metal reflective layer to a polymer-coated substrate and substrates produced by such methods are also provided.

15 Claims, 1 Drawing Sheet

DUAL-METAL REFLECTIVE LAYER RECORDABLE/ERASABLE OPTICAL MEDIA

BACKGROUND OF THE INVENTION

The present invention relates in general to the field of recording media; in particular, to a recordable/erasable optical storage medium with a dual-metal layer for reflection and methods for producing this layer as well as media produced by these methods.

Optical data storage media in the form of compact disks are well known as an alternative to long-playing records and magnetic tape cassettes. The disks with which consumers are familiar are optical read-only disks, and the common disk player is designed specifically for this type of disk. These disks have a reflective surface containing pits that represent data in binary form. A description of these pits and how they function is provided by Watkinson, "The Art of Digital Audio," Focal Press, Chapter 13 (incorporated herein by reference).

Compact disks are currently produced by a process similar to the process used to produce conventional long-playing records. The process, referred to herein as the mastering process, starts by first polishing a plain glass optical disk. This disk has an outside diameter from 200 to 240 mm, a thickness of 6 mm and undergoes various cleaning and washing steps. The disk is then coated with a thin chrome film or coupling agent, a step taken to produce adhesion between the glass disk and a layer of photo-resist, which is a photosensitive material. Data on a compact disk master tape are then transferred to the glass disk by a laser beam cutting method.

The glass disk is still completely flat after it is written on by the laser beam because pits are not formed until the glass is photographically developed. The disk surface is first made electrically conductive and then subjected to a nickel evaporation process. The disk, now known as the glass master, then undergoes nickel electrocasting, a process that is similar to that used in making analog phono records. A series of metal replications follow, resulting in a disk called a stamper. The stamper is equivalent to a photographic negative in the sense that it is a reverse of the final compact disk; that is, there are now bumps where there should be pits. This stamper is then used to make a pressing on a transparent polymer such as polyvinyl chloride, poly(ethyl-methacrylate), and polycarbonate. The stamped surface is then plated with a reflective film, such as aluminum or other metal, and finally a plastic coating is applied over the film to form a rigid structure.

The player operates by focusing the laser beam on the reflective metal through the substrate and then detecting reflected light. The optical properties of the substrate, such as its thickness and index of refraction, are thus critical to the player's detection systems and standard players are designed specifically with these parameters in mind.

The pits increase the optical path of the laser beam by an amount equivalent to a half wavelength, thereby producing destructive interference when combined with other (non-shifted) reflected beams. The presence of data takes the form of a drop in intensity of the reflected light. The detection system on a standard player is designed to require greater than 70% reflection when no destructive interference occurs and a modulation amplitude greater than 30% when data are present. These intensity limits, combined with the focusing parameters, set the criteria for the compact disks and other optical data storage media that can be read or played on such players.

Media on which data can be recorded directly, and read directly from, have a different configuration and operate under a somewhat different principle. One example is described in U.S. Pat. No. 4,879,709 (Clark) (incorporated herein by reference), see also U.S. Pat. No. 4,719,615 (Feyrer, et al.) (incorporated herein by reference).

The medium described in Clark includes a lower expansion layer of a rubbery material that expands when heated. The expansion layer is coupled to an upper retention layer that is glassy at ambient temperature and becomes rubbery when heated. Both layers are supported on a rigid substrate. The expansion and retention layers each contain dyes for absorption of light at different wavelengths. Data are recorded by heating the expansion layer by absorption of light from a laser beam at a "record" wavelength to cause the expansion layer to expand away from the substrate and form a protrusion or "bump" extending into the retention layer. While this is occurring, the retention layer rises in temperature above its glass transition temperature so that it can deform to accommodate the bump. The beam is then turned off and the retention layer cools quickly to its glassy state before the bump levels out, thereby fixing the bump.

Reading or playback of the data is then achieved by a low intensity "read" beam that is focused on the partially reflecting interface between the retention layer and air. When the read beam encounters the bump, some of the reflected light is scattered, while other portions of the reflected light destructively interfere with reflected light from non-bump areas. The resulting drop in intensity is registered by the detector. Removal of the bump to erase the data is achieved by a second laser beam at an "erase" wavelength that is absorbed by the retention layer and not by the expansion layer. This beam heats the retention layer alone to a rubbery state where its viscoelastic forces and those of the expansion layer return it to its original flat configuration. The write, read, and erase beams all enter the medium on the retention layer side, passing through retention layer before reaching the expansion layer.

In U.S. copending application Ser. No. 416,082 now U.S. Pat. No. 5,001,699 (assigned to the assignee of the present invention and incorporated herein by reference) an optical storage medium includes a triple layer recording structure having an expansion layer, a retention layer, and a very thin reflective layer interposed between the retention and expansion layers. See also U.S. Pat. No. 4,896,314 (Skiens et al.).

In one embodiment, copending U.S. application Ser. No. 07/516,509 (assigned to the assignee of the present application and incorporated hereby reference) describes a liquid reflective layer that is provided adjacent the retention layer opposite the expansion layer. Additionally, improved expansion and retention layers are also described therein. Copending U.S. application Ser. No. 07/414,041 (assigned to the assignee of the present application and incorporated herein by reference) describes a polymer "active" layer that is provided adjacent to the substrate and that serves to combine functions of the expansion and retention layers into a single layer. Copending U.S. application Ser. No. 07/414,044 (assigned to the assignee of the present application and incorporated herein by reference) describes a single, dual-purpose, retention/reflective layer that is adjacent to the expansion layer.

SUMMARY OF THE INVENTION

The present invention provides recordable/erasable optical storage media. More particularly, it provides optical storage media with a dual-metal layer for reflection and methods for producing this layer as well as media produced by these methods. The dual-metal layer is advantageous in that it provides improved stability for the reflective layer.

In addition to the dual-metal reflective layer, the media of the present invention generally include a rigid substrate and an expansion layer adjacent to the substrate. Usually adjacent to the expansion layer is a retention layer. Alternatively, the functions of the expansion and retention layers can be combined into a single, active layer. The dual-metal reflective layer is usually adjacent to the retention layer or the active layer if the latter is substituted for separate expansion and retention layers. The dual-metal reflective layer can also be sandwiched between the expansion layer and the retention layer. A protective layer is optionally present and is usually adjacent to the dual-metal reflective layer.

The media of the present invention are susceptible to expansion and relaxation, to writing data thermally, to erasing data thermally, and to reading data optically.

DETAILED DESCRIPTION OF THE INVENTION AND PREFERRED EMBODIMENTS

Figure 1:
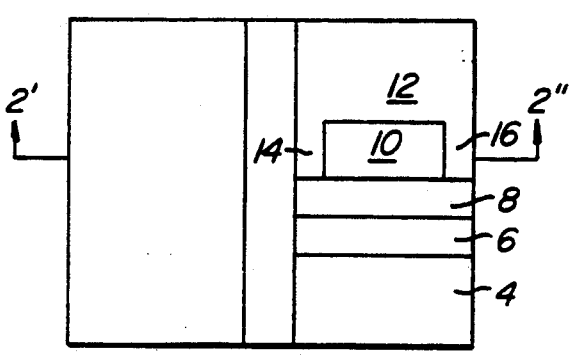
FIG. 1 is a cross section of an optical storage medium illustrating one embodiment of the present invention.
Figure 2:
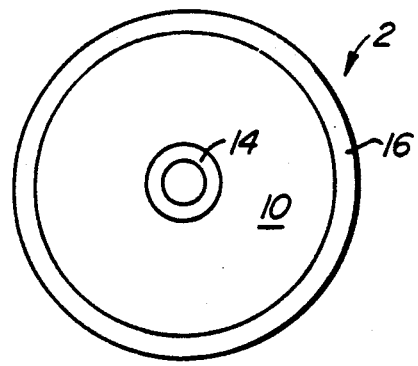
FIG. 2 is a top view along line 2'-2" of the medium shown in FIG. 1.

The present invention provides recordable/erasable optical storage media wherein a dual-metal reflective layer is present. In one embodiment, as shown in FIGS. 1 and 2, the medium comprises a substrate 4 onto which an expansion layer 6 is provided. A retention layer 8 is adjacent to the expansion layer. A dual-metal reflective layer 10 is adjacent to the retention layer. A protective layer 12 may also be present, although it is not necessary.

The substrate 4 is formed from a rigid transparent material that permits substantially full transmission of light for recordation, reading, and erasure. The substrate is sufficiently thick and rigid to provide structural integrity to the optical medium, and it does not deform in response to pressure caused by expansive forces in the adjacent active layer. Recordation bumps in the expansion or active layer, caused by the layer's thermal expansion upon absorption of the write beam's light energy, protrude away from the substrate because of its rigidity. With this layer arrangement, the bumps protrude into the reflective layer, as described below.

The substrate may be constructed from a wide variety of readily available materials. Merely by way of example, the substrate can be fabricated from glass, polymers, or amorphous polymers. In a preferred embodiment, the substrate is made of polycarbonate. In many embodiments, the substrate will be the thickest layer, with a thickness of about 1 mm or more, preferably about 1.2 mm. The thickness of the substrate must be such that it imparts rigidity to the optical medium.

In the embodiment shown in FIGS. 1 and 2, an expansion region or layer 6 is adjacent to the substrate. The expansion layer is usually formed of a material that absorbs a percentage of light energy passing through it; displays a high coefficient of thermal expansion, particularly when compared to the other layers of the medium; and displays a high coefficient of elasticity to the extent that it will expand readily when heated at the temperatures encountered during a recordation process without exceeding its upper expansive limit. The expansion layer must also contract to its original relaxed condition upon cooling.

When at room temperature, the expansion layer material should be near or above its softening temperature, which is preferably below 30° C. and more preferably at or below 20° C. By softening temperature, it is meant the temperature at which the modulus of elasticity of the material of the expansion layer has dropped to 25% to 50% of its maximum modulus. A coefficient of thermal expansion above about $1 \times 10^{-4}/°$ C. is preferred, with those greater than about $3 \times 10^{-4}/°$ C. more preferred, and those greater than about $5 \times 10^{-4}/°$ C. most preferred. The degree of single pass absorptivity of light energy should be between 20% and 40% in the wavelength range from 850 nm to 650 nm such that the expansion layer may be heated with a laser beam at a write wavelength. To maintain the ability to read data recorded on the optical media on standard detection mechanisms, such as those found on conventional compact disk players, a maximum double pass absorption at the standard compact disk read wavelength (780 nm) of 10% is most preferred.

Accordingly, the expansion layer material may comprise a base resin selected from a group including, but not limited to, rubbers, such as silicone rubbers, styrene-butadiene rubbers, and natural rubbers such as butyl rubbers; epoxies; polyurethane; polymers; amorphous polymers; cellulose acetate-butyrate; poly(vinyl butyryl); polyamides; acrylic polymers; polyvinyl acetate; silicone resins; styrene-butadiene copolymers; vinyl chloride-vinyl acetate copolymers; and mixtures thereof. Materials with high elasticity, such as elastomers and polymers with elongations greater than 15%, are preferred for construction of the expansion layer.

In a preferred embodiment, the expansion layer is an epoxy resin with a softening temperature below 50° C. and preferably at 30° C. or below. In another preferred embodiment, a base resin or mixture of resins is mixed with appropriate curing agents to form the expansion layer. For example, a bisphenol A/-epichlorohydrin epoxy resin (Shell 828, manufactured by Shell Chemical) and an epichlorohydrin-dimer fatty acid-based epoxy resin (Shell 871, manufactured by Shell Chemical) may be mixed in approximately equal amounts with a nonstoichiometric (e.g., 2.6x) amount of a curing agent, such as Versamid V150 (a polyamide resin that is an adduct of a polyamine with a dibasic fatty acid, manufactured by Henkel). Additionally, Shell 828 may be mixed with a nonstoichiometric (e.g., 1.5x) amount of a curing agent such as Dow DEH52 (an aliphatic polyamine-epoxy adduct, manufactured by Dow Chemical).

The thickness of the expansion layer is selected in accordance with the optics of the system. For example, in order to maintain the minimum bump size during data recordation with the greatest write sensitivity during recording, a laser beam should be maintained as small as possible as it passes through the expansion layer. Accordingly, most of the expansion layer should be within the focal depth of the write beam. For recording systems having optical parameters similar to those found in standard compact disk players, the write beam is diffraction limited and has a focal depth of approximately 1.0–2.0 microns. In such cases, best results can be obtained with an expansion layer having a thickness of approximately 0.5 to 3.0 microns, preferably about 1.0 microns.

The expansion layer is bonded to the substrate and, in the embodiment depicted in FIGS. 1 and 2, to the retention region or layer 8. This is achieved by methods known in the art. For example, coating of the expansion layer onto the substrate may be accomplished by a wet chemical process, such as spin coating or web coating. The retention layer is then deposited onto the expansion layer, utilizing, for example, vacuum deposition, sputtering, or chemical vapor deposition.

The retention layer is usually formed from a material that absorbs a percentage of light energy passing through it; displays a glass transition temperature that is above room temperature, preferably about that of the expansion layer; is rubbery, when above its glass transition temperature, with sufficient elasticity to permit it to conform to the contour of the distortion formed in it by the heated expansion layer; and displays sufficient rigidity and strength below its glass transition temperature such that it will hold the expansion layer in an expanded condition, even when the expansion layer is cooled to ambient temperature.

In preferred embodiments, the retention layer is formed of material or combinations of materials that display at least some light absorption at the wavelength of an erase beam. The wavelength of the erase beam may be chosen from a wide spectrum of available light wavelengths. The degree of absorptivity may vary from wavelength to wavelength, and from retention material to retention material, but may be, for example, about 30% to 45% at wavelengths between about 650 nm and 860 nm.

Accordingly, the retention layer material includes, but is not limited to, rubbers, such as silicone rubbers, styrene-butadiene rubbers, and natural rubbers such as butyl rubbers; epoxies; polyurethane; polymers; amorphous polymers; cellulose acetate-butyrate; poly(vinyl butyryl); polyamides; acrylic polymers; polyvinyl acetate; silicone resins; styrene-butadiene copolymers; vinyl chloride-vinyl acetate copolymers; and mixtures thereof.

In a preferred embodiment, the retention layer is an epoxy with a glass transition temperature of about 80° to 120° C. and may be, for example, about 105° C. The retention layer will typically have a Young's modulus of at least about 400,000 psi. The thickness of the retention layer is approximately 0.5 to 1.5 microns, and a preferred range is from about 0.5 to about 1.0 microns.

Figure 3:
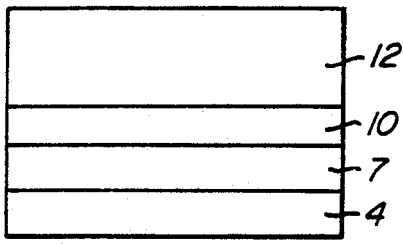
FIG. 3 illustrates an alternative embodiment of this invention in cross section wherein the functions of the active and retention layers are combined into a single, active letter.

In another embodiment, as shown in FIG. 3, a single polymer layer, termed the active region or layer 7, is adjacent to the substrate and alleviates the need for separate expansion and retention layers. Both recording and erasure can be accomplished with a single laser beam, and there is necessarily one less separate coating operation involved in the manufacture of a medium with an active layer.

The active layer is comprised of any polymer whose softening temperature is above room temperature (approximately 20° C.) and that has a relatively large coefficient of expansion above its softening temperature. By softening temperature, it is meant the temperature at which the modulus of elasticity of the material of the active layer has dropped to 25% to 50% of its room temperature or maximum modulus. A softening temperature range of approximately 30° C. to 175° C. is preferred, with a more preferred range of approximately 90° C. to 130° C. The coefficient of expansion should be greater than $200 \times 10^{-6}/°$ C., and is preferably greater than $250 \times 10^{-6}/°$ C., and more preferably greater than $300 \times 10^{-6}/°$ C.

The active layer material may comprise a base resin selected from a group including, but not limited to, epoxies, polyurethane, polymers, amorphous polymers, cellulose acetate, cellulose acetate-butyrate, polystyrene, polysulfonamide, polycarbonate, cellulose nitrate, poly(ethyl-methacrylate), poly(vinyl butyryl), aromatic polyesters, polyamides, acrylic polymers, polyvinyl acetate, silicone resins, alkyd resins, styrene-butadiene copolymers, vinyl chloride-vinyl acetate copolymers, nitrocellulose, ethylcellulose, and mixtures thereof. In a preferred embodiment, the active layer is an epoxy with a softening temperature of about 80° C. to 120° C. and may be, for example, about 105° C.

In more preferred embodiments, a base resin or mixture of resins may be mixed with appropriate curing agents to form the active layer or region. In particular, a bisphenol A/-epichlorohydrin epoxy resin (Shell 828, manufactured by Shell Chemical) and an epichlorohydrin-dimer fatty acid-based epoxy resin (Shell 871, manufactured by Shell Chemical) may be mixed in approximately equal amounts with a nonstoichiometric (e.g., 2.6x) amount of a curing agent, such as Versamid V150 (a polyamide resin that is an adduct of a polyamine with a dibasic fatty acid, manufactured by Henkel). Additionally, Shell 828 may be mixed with a nonstoichiometric (e.g., 1.5x) amount of a curing agent such as Dow DEH52 (an aliphatic polyamine-epoxy adduct, manufactured by Dow Chemical).

The thickness of the active layer is approximately 0.5 to 3.0 microns. A preferred range is 1.0 to 2.0 microns. The active layer is bonded to the substrate by methods known in the art. For example, coating of the active layer onto the substrate may be accomplished by a wet chemical process, such as spin coating or web coating.

Figure 4:
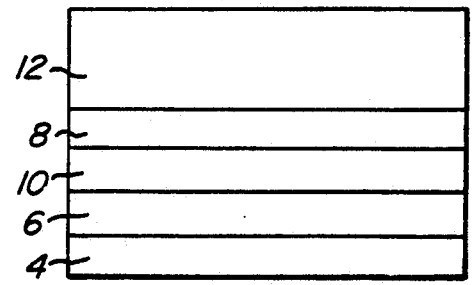
FIG. 4 illustrates another embodiment in cross section wherein the dual-metal reflective layer is sandwiched between the expansion and retention layers.
Figure 7:
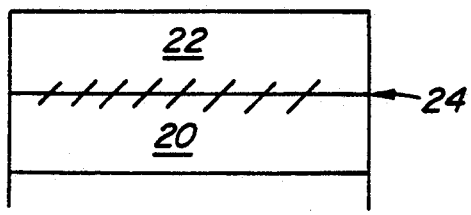
FIG. 7 illustrates in cross section the structure of the dual-metal reflective layer.

The dual-metal reflective region or layer 10 is adjacent to either the retention layer or to the active layer, depending upon the selected embodiment. Alternatively, the dual-metal reflective layer can be sandwiched between the expansion and retention layers, as shown in FIG. 4. As shown in FIG. 7, the dual-metal reflective layer of the present invention is heterogeneous and comprised of a first metal subregion or sublayer 20 and a second metal subregion or sublayer 22 with a graded first metal/second metal alloy 24 at the interface of the first and second metal subregions or sublayers. The first metal comprises any highly reflective metal that forms low melting alloys with gallium in the range from about 0° C. to about 25° C., preferably in the range from about 20° C. to about 25° C. Preferred metals are those selected from the group consisting of indium, silver, bismuth, lead, zinc, and alloys thereof. The second metal is comprised of gallium or alloys thereof.

The heterogeneous dual-metal reflective layer of the present invention is advantageous in that it adheres like a solid metal film yet performs like a passive liquid metal. The first metal forms a solid polymer-metal interface with the retention layer, as in the embodiment shown in FIG. 1; or with the active layer, as in the embodiment illustrated in FIG. 3; or with the expansion and retention layers, as in the embodiment shown in FIG. 4. The second metal then wets well to the mushy solid or liquid/solid mixture of the first metal and partially diffuses into it to form a graded alloy that behaves as a passive liquid metal. The metals of the first and second layer are both very soft, highly reflective, and very soluble in each other. As such, the dual-metal reflective layer offers little or no resistance to recordation bump formation during the laser write process, and the texture of the dual-metal layer is such that the layer remains stable during the erasure process.

Specifically, the dual-metal reflective layer can vary in thickness from about 2,000Å to about 10,000Å, preferably from about 4,500Å to about 6,000Å, and more preferably from about 4,500Å to about 5,200Å. The first metal sublayer can have a thickness in the range from about 500Å to about 1,500Å, preferably from about 800Å to about 1,200Å and more preferably from about 1,000Å to about 1,200Å. The second metal sublayer can vary in thickness, depending upon the selected thickness and content of the first metal sublayer. In general, a preferred thickness range is from about 3,000Å to about 6,000Å, preferably from about 3,500Å to about 4,000Å. Additionally, in a preferred embodiment, the second metal sublayer is comprised of separately sputtered regions or layers and, more preferably, five separately sputtered layers, each layer having a thickness from about 700Å to about 800Å. In this latter more preferred embodiment, the second metal sublayer has a thickness from about 3,500Å to about 4,000Å and the first metal sublayer has a thickness from about 1,000Å to about 1,200Å, resulting in an overall dual-metal reflective layer thickness from about 4,500Å to about 5,200Å.

Figure 5:
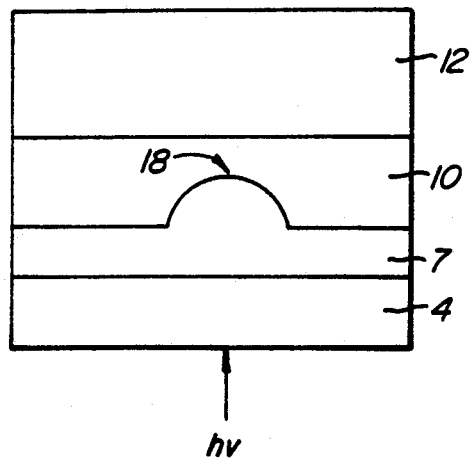
FIG. 5 illustrates in cross section a recordation bump formed on the medium of FIG. 3 wherein the dual-metal reflective layer is relatively thick and encompasses the recordation bump extending from the active layer.
Figure 6:
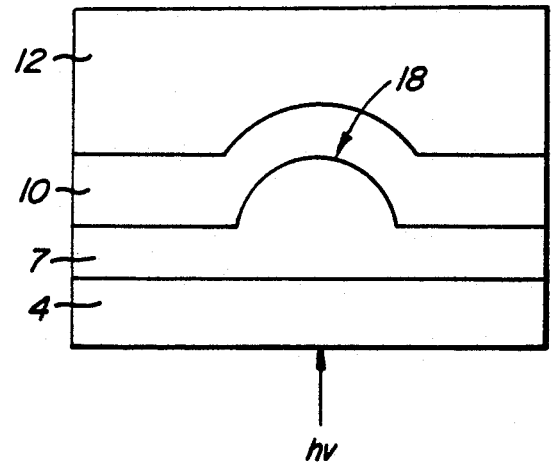
FIG. 6 illustrates in cross section a recordation bump formed on the medium of FIG. 3 wherein the dual-metal reflective layer is relatively thin and is deformed out by the recordation bump extending from the active layer through the dual-purpose reflective layer.

If the overall reflective layer is relatively thick, for example from about 5,000Å to about 10,000Å, then recordation bumps deform and are encompassed by the reflective layer but do not protrude into the protective layer 12, if such a layer is present. This is shown in FIG. 5, with an active layer present. If, however, the reflective layer is relatively thin, for example, less than about 5,000Å, then the recordation bumps deform the reflective layer and protrude into the protective layer, if present. This is shown in FIG. 6, with an active layer present.

One or more protective regions or layers 12 may be present, which serve to protect the recordation bumps from damage due to contact with external objects. Characteristic of this layer is that it is sufficiently compliant, when the dual-metal reflective layer is thin, to allow the recordation bumps to easily protrude into it and to offer little resistance to their formation. In addition, the protective layer preferably is relatively thick when compared to the other layers so that the bumps are not transmitted through the reflective layer, into the protective layer, and subsequently through the protective layer to its outer surface. It is also preferred, although not necessary, that the protective layer have a high thermal conductivity to enable it to function as a heat sink for purposes of rapid cooling of the active layer, if present, immediately following formation of the bumps. A thermal conductivity of at least $5 \times 10^{-4}$ cal/((cm$^2$/° C.)(sec/cm)) will provide adequate results. Suitable materials for use as a protective layer include silicone and acrylate.

The protective layer may or may not be required depending on the functionality, storage, and handling of the optical disk. Thus, in an application where the disk is stored and operated in a protective case or cartridge, a protective layer may not be required. A protective layer may also not be required where the dual-metal reflective layer is of sufficient thickness so that the recordation bumps are not transmitted through the reflective layer to its outer surface.

In one embodiment, as shown in FIG. 1, the protective layer will enclose and contain the dual-metal reflective layer, this being accomplished by the protective layer being provided with an inner ring 14 and an outer ring 16 that extend to and contact the retention layer or the active layer, if the latter is present instead of a retention layer. The thickness of the inner and outer rings is selected in accordance with the desired thickness of the reflective layer. In a preferred embodiment, the width of the rings is between about 1 mm and 4 mm. Alternatively, as shown in FIGS. 3 and 4, the dual-metal reflective layer may extend to the edges of the disk so that the protective layer does not contain it. The thickness of the optional protective layer is on the order of tens of microns, as it must be thick enough to protect the recordation bumps from external abuse. Preferably, the protective layer is about 2 microns thick.

The present invention also includes methods for applying the dual-metal reflective layer to a polymer-coated substrate, such as is present in optical storage media. These processes require a minimum of treating and also do not require substrate cooling. The present processes comprise the steps of: sputtering a first metal onto a polymer-coated substrate and then sputtering a second metal onto the sputtered first metal. The first metal comprises any highly reflective metal that forms low melting alloys with gallium in the range from about 0° C. to about 25° C., preferably in the range from about 20° C. to about 25° C. Preferred metals are those selected from the group consisting of indium, silver, bismuth, lead, zinc, and alloys thereof. The second metal is comprised of gallium or alloys thereof.

Preferred conditions for sputtering the first metal include performing the process in a vacuum chamber, preferably having an initial chamber pressure of about $5 \times 10^6$ torr or less. The first metal, preferably indium, is sputtered to a thickness from about 500Å to about 1,500Å, preferably from about 800Å to about 1,200Å, and more preferably from about 1,000Å to about 1,200Å, at a rate from about 80Å/sec to about 120Å/sec, preferably at about 120Å/sec.

Preferred conditions for sputtering the second metal onto the sputtered first metal include performing the second step immediately without breaking the vacuum whereby alloying of the second metal sublayer with the first metal sublayer is improved. If the second metal sublayer is applied in the same vacuum chamber immediately after applying the first metal sublayer, the formation of an oxide layer is avoided.

The second metal is sputtered to a preferred total thickness from about 3,000Å to about 6,000Å, preferably from about 3,500Å to about 4,000Å, at a rate from about 10Å/sec to about 15Å/sec, preferably at about 12Å/sec.

In a preferred embodiment, the second metal sublayer is sputtered more than one time. Herein, an initial layer having a thickness from about 700Å to about 800Å is applied. After pausing, preferably for about 1 to about 2 minutes and more preferably about 2 minutes, a second layer is deposited, and this process can be repeated until a preferred amount of about five separate layers have been deposited. Other numbers of separate layers can be employed, although heating and cooling of the previously sputtered layer is a critical factor. Pausing between sputtering separate layers of the second metal allows the target layer to cool. If the target layer is allowed to cool too much, moisture condensation will be present. If, however, the target layer is heated too much, then the metal will melt and become unwieldy to handle. As the melting point of gallium is about 29.8° C., the second metal sublayer should not be allowed to heat to this level.

The present invention also includes dual-metal reflective layer, polymer-coated substrates produced by the above-discussed methods, preferably those substrates produced by the methods wherein the second metal is sputtered more than one time and, more preferably, about five times.

FIGS. 5 and 6 illustrate the invention during/after the writing (either during the initial recording or during subsequent recordings) of an optically detectable recordation bump 18; however, for purposes of illustration, the recordation bump is not necessarily in proportion to the respective layers. To write, a laser beam (indicated as $h\nu$) enters the substrate and passes into the active layer, or into the expansion layer in an alternative embodiment, where it is absorbed at a particular wavelength, known as the write wavelength. The absorptive characteristics of the layer may be imparted thereto using methods that will be apparent to those of skill in the art, such as by the addition of light-absorptive dyes or pigments. Since the medium of the present invention need not be wavelength-specific, a broad range of dyes or pigments is available for this purpose.

In addition, except for the ability to pass a portion of the wavelength energy that is employed for the purpose of reading the recorded data, these dyes or pigments need not be wavelength-specific and may therefore absorb light energy over a broad spectrum of wavelengths. Thus, during recordation, the laser beam is absorbed by a dye or a pigment contained within the active layer, or the expansion layer, that will absorb light from the laser beam at the write wavelength to cause the active layer, or the expansion layer, to expand away from the substrate and form recordation bumps extending into the reflective layer. Dyes or pigments that can be used singly or in combination are nigrosin blue, aniline blue, Calco Oil Blue, ultramarine blue, methylene blue chloride, savinal blue, Monastral Blue, Malachite Green Oxalate, Sudan Black BM, Tricon blue, Macrolex green G, DDCI-4, and IR26. Preferred among these are savinal blue, Tricon Blue, and Macrolex green G.

Because the absorption of the beam by the dye or pigment occurs progressively throughout the complete thickness of the active layer, if present, a thermal gradient is created within the layer. This gradient depends on the amount of energy that is absorbed at a given depth within the layer. The incident surface of the active layer is necessarily heated to a higher temperature than its opposite surface, which results in a progressive absorption through the layer, and a thermal gradient is formed between the two surfaces. The heated spot of the active layer is confined by a surrounding low temperature area, and expansion can take place only away from the substrate. The dual-metal reflective layer acts as a passive component so that when a recordation bump is formed, the bump will protrude into the reflective layer and it will conform around the bump. In addition to improving reflection, the dual-metal reflective layer acts as a heat sink during recordation and causes the active layer to cool more rapidly at its opposite surface. When the laser beam is turned off, the opposite surface of the active layer will cool much more rapidly than the incident surface, resulting in a temperature below the softening temperature of the polymer for the opposite surface. The opposite surface thus becomes rigid and locks the recordation bump into place while the hotter incident surface area is still expanded.

If an expansion layer is used, the dye(s) or pigment(s) in the expansion layer absorb a high proportion of the energy at the wavelength of the writing laser to form a heated area in the layer. The heated spot of the polymer expansion layer is confined by a surrounding low temperature area, and expansion can take place only away from the substrate and into the reflective layer.

After the optical medium has been recorded, as described above, erasure can be achieved by methods known in the art. For example, this may be accomplished by "spot" erasure, where either a different laser with a larger focused point, or the same laser used to record on the medium but defocused to a slightly larger spot, can be used to focus a light beam through the substrate and, in one embodiment, the active layer. Erasure therein occurs when a recorded area of the active layer is heated relatively slowly to the softening temperature of the active layer and is then cooled slowly so that the active layer relaxes to its original unwritten state. By heating the active layer slowly, a steep temperature gradient is not formed through the thickness of the layer such as was formed during recordation. The cooling rate of the active layer is now slower than its viscoelastic restoring forces so that the polymeric material of the layer returns to its original spatial arrangement.

If, instead, an expansion layer is present, erasure occurs when a recorded area of the expansion layer is heated relatively slowly to above the melting point temperature of the retention layer to a temperature at which the polymer expansion layer softens. The layers are then cooled slowly so that both the expansion layer and the retention layer return to their original spatial arrangements. By heating and then cooling the expansion layer slowly, the cooling rate of the layer is now slower than its viscoelastic restoring forces so that the polymeric material of the layer relaxes to its original unwritten state. The retention layer then resolidifies over the expansion after the relaxation of the expansion layer. Suitable dyes for incorporation into the retention layer include those dyes described above for the expansion layer.

Unlike much of the prior art, there is no requirement herein that the write or recordation wavelength be different from the erasure wavelength. The write wavelength chosen can be the same wavelength as used for erasure, and this is preferred. The previous need for two lasers, to record and to erase, with different wavelengths corresponding to the absorption frequencies of different dyes in separate expansion and retention layers, is eliminated by the present invention.

Reading of the recorded data (recordation bumps) from the optical disk is achieved by focusing a light beam, chosen from a wide spectrum of available light wavelengths, through the substrate and through the active layer or the expansion layer. Playback or reading can be accomplished, for example, on standard compact disk systems. The media of the present invention are compatible with such standard systems: the active layer or the expansion layer is transparent at the read wavelength of 780 nm; the reflectance of the reflective layer is 70% or greater at the read wavelength; the recordation bumps generate interference with the reflected light beam; and the interference is then detected by the read or playback system.

It is to be understood that the above description is intended to be illustrative and not restrictive. Many embodiments will be apparent to those ordinary of skill in the art upon reviewing the above description. By way of example, although the invention has been illustrated with reference to the use of lasers as the radiant energy source, other sources can be used and will be readily apparent to one of ordinary skill. The feature of a dual-metal reflective layer can be combined with other arrangements of the substrate, expansion and retention layers (or substituted active layer), and protective layer. The scope of the invention, therefore, should be determined with reference to the appended claims, along with the full scope of equivalents to which such claims are entitled, and should not be limited to the above description.

What is claimed is:

1. A recording medium comprising:
    a substrate;
    an expansion region adjacent the substrate, the expansion region expanding in the presence of radiation at a write wavelength;
    a retention region adjacent the expansion region, the retention region ceasing to retain an optically detectable bump upon exposure to radiation at an erase wavelength; and
    a heterogeneous dual-metal reflective region adjacent the retention region, the reflective region reflecting received radiation.

2. A recording medium comprising:
    a substrate;
    an expansion region adjacent the substrate, the expansion region expanding in the presence of radiation at a write wavelength;
    a retention region adjacent the expansion region, the retention region ceasing to retain an optically detectable bump upon exposure to radiation at an erase wavelength; and
    a dual-metal reflective region adjacent the retention region, the reflective region reflecting received radiation,
    wherein the dual-metal reflective region comprises a first metal subregion and a second metal subregion having a first metal/second metal graded alloy at the interface of the first metal subregion and the second metal subregion.

3. The recording medium according to claim 2 wherein the first metal is selected from the group consisting of indium, silver, bismuth, lead, zinc and alloys thereof and the second metal is selected from the group consisting of gallium and alloys thereof.

4. The recording medium according to claim 3 further comprising:
    a protective region adjacent the dual-metal reflective region, the protective region retaining the dual-metal reflective region against the retention region.

5. A recording medium comprising:
    a substrate;
    an active region adjacent the substrate, the active region exhibiting a thermal gradient and viscoelastic characteristics in the presence of radiation at a write wavelength sufficient to form an optically detectable bump upon exposure to a wavelength of light and to retain the bump upon cessation of the wavelength of light; and
    a heterogeneous dual-metal reflective region adjacent the retention region, the reflective region reflecting received radiation.

6. A recording medium comprising:
    a substrate;
    an active region adjacent the substrate, the active region exhibiting a thermal gradient and viscoelastic characteristics in the presence of radiation at a write wavelength sufficient to form an optically detectable bump upon exposure to a wavelength of light and to retain the bump upon cessation of the wavelength of light; and
    a dual-metal reflective region adjacent the retention region, the reflective region reflecting received radiation,
    wherein the dual-metal reflective region comprises a first metal subregion and a second metal subregion having a first metal/second metal graded alloy at the interface of the first metal subregion and the second metal subregion.

7. The recording medium according to claim 6 wherein the first metal is selected from the group consisting of indium, silver, bismuth, lead, zinc and alloys thereof and the second metal is selected from the group consisting of gallium and alloys thereof.

8. The recording medium according to claim 7 further comprising:
    a protective region adjacent the dual-metal reflective region, the protective region retaining the dual-metal reflective region against the active region.

9. A recording medium comprising:
    a substrate;
    an expansion region adjacent the substrate, the expansion region expanding in the presence of radiation at a write wavelength;
    a heterogeneous dual-metal reflective region adjacent the expansion region, the reflective region reflecting received radiation; and
    a retention region adjacent the dual-metal reflective region, the retention region ceasing to retain an optically detectable bump upon exposure to radiation at an erase wavelength.

10. A recording medium comprising:
    a substrate;

an expansion region adjacent the substrate, the expansion region expanding in the presence of radiation at a write wavelength;

a dual-metal reflective region adjacent the expansion region, the reflective region reflecting received radiation; and a retention region adjacent the dual-metal reflective region, the retention region ceasing to retain an optically detectable bump upon exposure to radiation at an erase wavelength, wherein the dual-metal reflective region comprises a first metal subregion and a second metal subregion having a first metal/second metal graded alloy at the interface of the first metal subregion and the second metal subregion.

11. The recording medium according to claim 10 wherein the first metal is selected from the group consisting of indium, silver, bismuth, lead, zinc and alloys thereof and the second metal is selected from the group consisting of gallium and alloys thereof.

12. The recording medium according to claim 11 wherein the first metal is indium and the second metal is gallium.

13. The recording medium of claim 12 wherein the first metal subregion has a thickness from about 1,000Å to about 1,200Å and the second metal subregion has a thickness from about 3,500Å to about 4,000Å.

14. The recording medium of claim 13 wherein the second metal subregion consists of five separately applied regions, each having a thickness from about 700Å to about 800Å.

15. The recording medium according to claim 14 further comprising:

a protective region adjacent the retention region, the protective region retaining the retention region against the dual-metal reflective region.

* * * * *